US006625646B1

United States Patent
Kamanaka et al.

(10) Patent No.: US 6,625,646 B1
(45) Date of Patent: Sep. 23, 2003

(54) COMMUNICATIONS METHOD, COMMUNICATIONS SYSTEM, COMMUNICATIONS DEVICE, AND SERVER

(75) Inventors: Nobuo Kamanaka, Kanagawa (JP); Minoru Tsukui, Chiba (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/393,280

(22) Filed: Sep. 10, 1999

(30) Foreign Application Priority Data

Mar. 11, 1999 (JP) .......................................... 11-064460

(51) Int. Cl.[7] .......................................... G06F 15/173
(52) U.S. Cl. ...................................... 709/224; 709/246
(58) Field of Search ........................ 709/203, 217–219, 709/223–224, 246; 713/201–202

(56) References Cited

U.S. PATENT DOCUMENTS

| 5,706,427 A | * | 1/1998 | Tabuki ........................ 713/201 |
| 5,881,233 A | * | 3/1999 | Toyoda et al. .............. 709/233 |
| 5,911,776 A | * | 6/1999 | Guck .......................... 709/217 |
| 6,128,644 A | * | 10/2000 | Nozaki ....................... 709/203 |
| 6,145,084 A | * | 11/2000 | Zuili et al. .................. 713/201 |

* cited by examiner

Primary Examiner—Ayaz Sheikh
Assistant Examiner—Philip B. Tran
(74) Attorney, Agent, or Firm—Greenblum & Bernstein, P.L.C.

(57) ABSTRACT

A communications method, communications system, communications device, and server which confirm performance information of a receiver communications device without negotiating with the receiver communications device before sending data, and sends an image most suited to receiving capability of the receiver communications device. The sender reads out performance information of the receiver communications device stored typically in a server before sending data, and sends data after converting the format of data to be sent based on the performance information. The communications device communicates with the server and sends data in the form of electronic mail and TCP/IP communications. Since, image data is sent after converting its format to that best matched receiving capability of the receiver communications device, the receiver communications device can receive image data best suited to its performance.

8 Claims, 9 Drawing Sheets

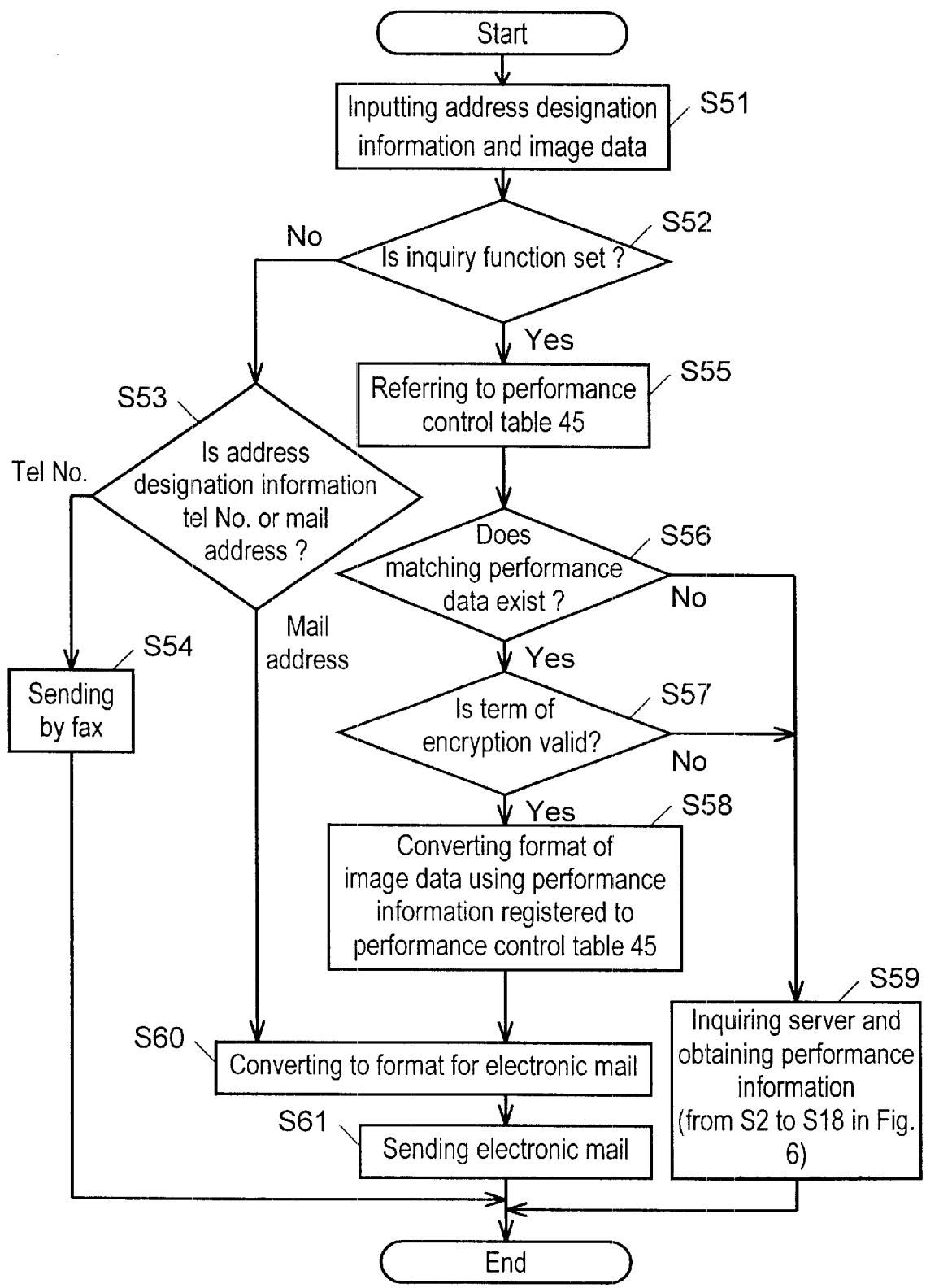

COMMUNICATIONS METHOD, COMMUNICATIONS SYSTEM, COMMUNICATIONS DEVICE, AND SERVER

FIELD OF THE INVENTION

The present invention relates to the field of communications methods, communications systems, communications devices, and server for networking systems linking more than one communications device.

BACKGROUND OF THE INVENTION

Conventionally, when sending facsimile data via networks such as LAN, PC communications, the Internet, and so on, no negotiation process takes place between sender and receiver communications devices. Therefore, no information is provided to the sender communications device to specify performance such as paper size and resolution of the receiver communications device. Accordingly, data is generally converted to a basic format covering minimal functions specified by so-called minimum set standard.

The conventional technology determines to send images converted to the minimal basic format specified by the minimum set even when both sender and receiver communications devices have higher performance. Therefore, it limits the system to sending and receiving images with low picture quality, and at low transmission efficiency, in some cases, even if both sender and receiver communications devices are capable of sending and receiving higher quality images.

The present invention aims to solve such problems. An object of the present invention is to provide a communications method, communications system, communications device, and server which allow the transmission of the optimal image in the context of the receiving performance of the receiver communications device by first confirming the data that describes the maximum available capability (hereinafter referred to as the performance information of the receiver communications device before sending the data.

SUMMARY OF THE INVENTION

The communications system of the present invention includes a network line, more than one communications device connected to the network line, and server(s) which are connected to the network line and which stores the performance data of the connected communications devices. The server provides this performance data when receiving an inquiry from the communications devices.

The method of the present invention is employed in the above communications system. A first communications device obtains the performance data of a second communications device without negotiating directly with the second communications device, converts the format of the data to be sent based on the performance data obtained, and sends the data in the newly converted format to the second communications device through the network line.

The communications device of the present invention is employed in the above communications system. A sender communications device in the communications devices comprises means for inputting address designation information for specifying a receiver communications device, and means for obtaining the performance data of the receiver communications device stored in a place separate from the receiver communications device itself based on the input address designation information.

Furthermore, the server of the present invention is employed in the above communications system, and includes a memory for storing performance data at least on the receiving performance of one or more communications devices in the above communications devices, and means for providing the performance data in response to an inquiry from the communications devices.

For calling the performance exchange server or sending data, electronic mail, DNS (Domain Name System) protocol, and TCP/IP (Transmission Control Protocol/ Internet Protocol) communications are employed. Here, electronic mail includes those sent via a network linked system of personal computers (hereinafter referred to as PCs) and workstations connected such as by a LAN or PC network, and so-called E-mail sent via the Internet.

Accordingly, the format of the image data to be sent is converted to that best matched to that of the receiving performance of the receiver, and sent via electronic mail or TCP/IP communications. The receiver thus can receive images in the format best suited to the performance of its receiving device.

If the performance data is not available on the performance exchange server, or a format error occurs in the returned performance information, the data to be sent is instead sent by mail in a basic format so that image data may still be transmittable via electronic mail or TCP/IP communications.

Furthermore, if the performance data is not available, and only a telephone number is identified, image data is sent by facsimile to ensure that the receiver receives the image data.

BRIEF DESCRIPTION OF THE DRAWINGS

FIG. 10 is a flow chart illustrating transmission based on determination to inquire performance information of a receiver communications device to the performance exchange server in the communications device of the present invention.

DESCRIPTION OF THE PREFERRED EMBODIMENT

First Exemplary Embodiment

A communications system in a first exemplary embodiment of the present invention is described with reference to drawings.

The basic configuration of the present invention is a network communications system to which is added a performance exchange server for storing performance information of more than one communications device connected to the network. The performance exchange server stores information on receiving performance mainly related to the image transmission capabilities of the communications devices, and provides the performance information of the designated communications device in response to inquiries from other communications devices.

Figure 1:
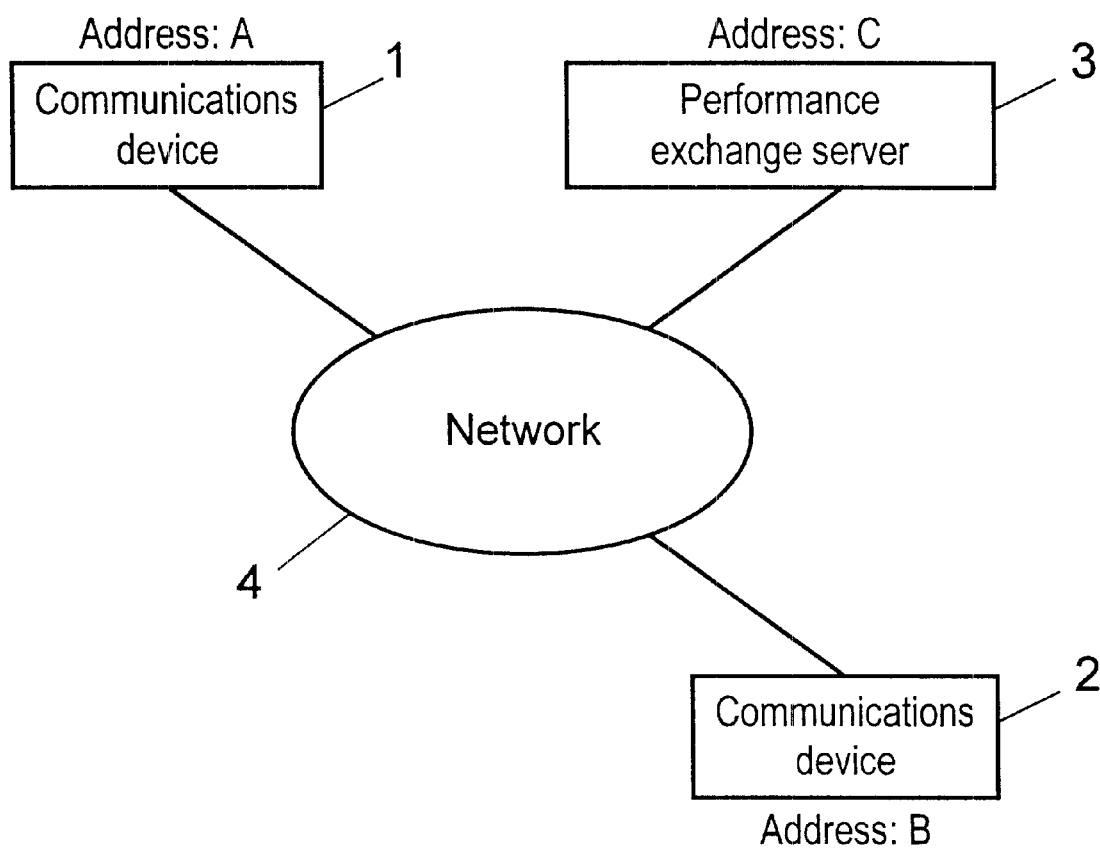
FIG. 1 is the basic configuration of the communications system of the present invention.

FIG. 1 is a diagram demonstrating the basic concept of the communications system in the first exemplary embodiment. A communications device 1 having Address A, communications device 2 having Address B, and a performance exchange server 3 having Address C are mutually connected via a network 4. Transmission of image data from Address A, the communications device 1, to Address B, the communications device 2 is described next. "Address" in the description refers to address designation information for identifying each communications device on the network. For example, this includes E-mail addresses, telephone numbers, and URLs. Any information which can be used for specifying a communications device is acceptable.

First, the sender communications device 1 queries the performance exchange server 3 and obtains the performance information of the receiver communications device 2. The communications device 1 then converts the image data based on this performance information, and sends the converted image data to the communications device 2. Accordingly, the communications device 1 can transmit images with picture quality and transfer rate conforming to the image transmission performance of the communications device 2. In FIG. 1, a single sender communications device and a single receiver communications device are illustrated. In an actual system, however, many communications devices are mutually connected via the network 4 to form a communications system. It is apparent that between these communications devices will also function in the same as described above.

In FIG. 1, the network is expressed as a simple loop. However, as described above, there is no limitation to the form of a network. The exemplary embodiment is also applicable to a complicated distributed network such as the Internet.

In the above description, the performance exchange server 3 is, for simplification, described as an exclusive server. However, the performance exchange server 3 may also take the form of other servers or gateways. Furthermore, in a distributed network, a group of distributed performance exchange servers, in which a performance exchange server 3 may be provided at each point of the network to split the performance information exchange function, is effective.

The receiver communications device 2 may also register its performance information with the performance exchange server 3, and then make a request to the sender communications device 1 to send image data.

Second Exemplary Embodiment

Functions of the communications devices 1 and 2 constituting the communications system of the present invention are described next.

Figure 2:
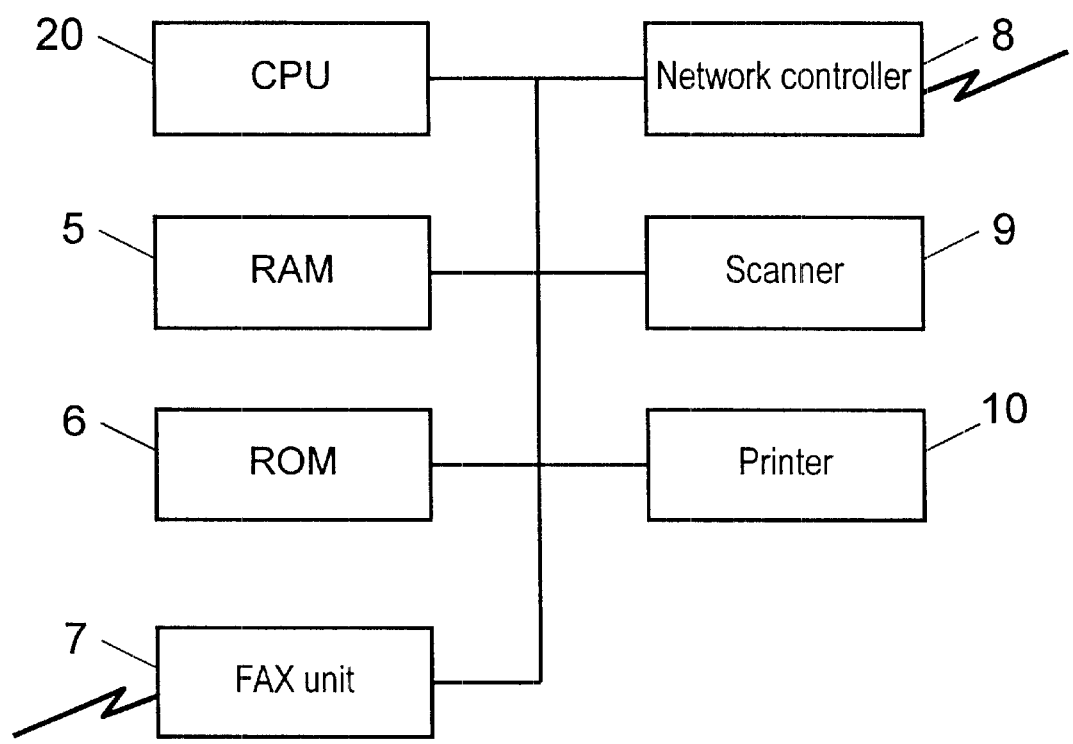
FIG. 2 is a block diagram illustrating major components of a communications device of the present invention.

FIG. 2 shows a block diagram of major components configuring the communications device. A CPU (central processing unit) 20 controls the operation of the entire communications device. A RAM (random access memory) 5 stores data to be sent, mail data to be sent, etc., and a ROM (read only memory) 6 stores a work program of the communications device. A FAX (facsimile) unit 7 sends and receives facsimile data, and a network controller 8 connects the communications devices to the network for sending and receiving data. A scanner 9 for inputting images, and a printer 10 for outputting characters, drawings, and images are provided as required. The fax unit 7 is also not always necessary.

The communications device only for receiving data may have different configuration from the above communications device. As long as it is equipped with a function to receive data such as in the form of electronic mail and TCP/IP communications, other configurations are applicable.

Figure 4:
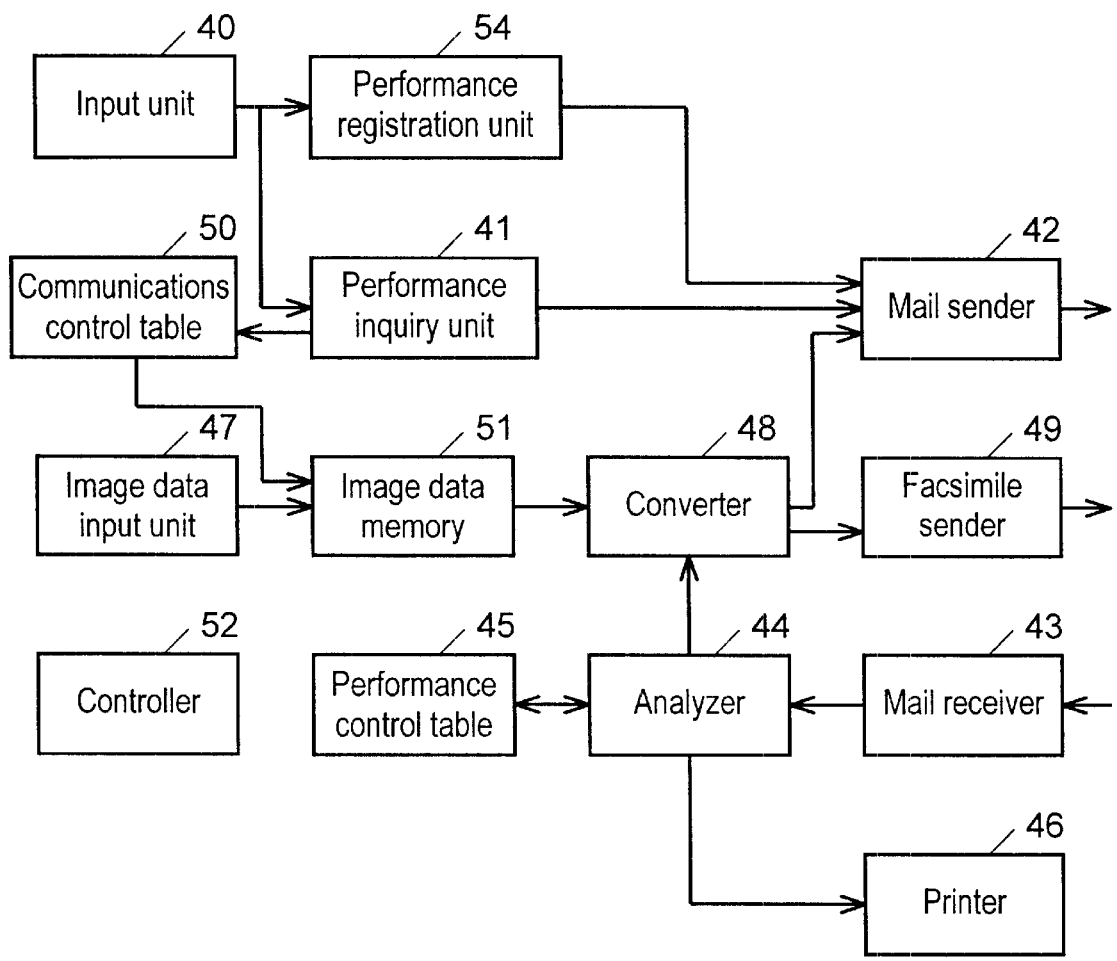
FIG. 4 is a block diagram of functions of the communications device of the present invention.

FIG. 4 shows a block diagram illustrating functions of the communications device of the present invention. First, the function of the sender communications device 1 to query performance information of the receiver communications device 2 to the performance exchange server 3 and then send data is described.

At an input unit 40, an operator inputs address designation information such as mail address and telephone number to specify the receiver communications device 2, using keyboards and control panels. A performance inquiry unit 41 of the sender communications device 1 creates a message for inquiring the performance information of the designated receiver communications device 2. A mail sender 42 sends this inquiry message to the performance exchange server 3 in the form of electronic mail. Here, the sender communications device 1 stores a set record of the address designation information of the receiver communications device 2, which is under query, and a memory position of image data to be sent, i.e. query record, in a communications control table 50. In response to query electronic mail, the performance exchange server 3 returns the performance information of the designated receiver communications device 2 in the form of electronic mail. Processing at the performance exchange server 3 is detailed later.

A mail receiver 43 in the sender communications device 1 receives the electronic mail returned from the performance exchange server 3. An analyzer 44 analyzes the electronic mail, and the performance control table 45 stores it. This is how the sender communications device 1 obtains the performance information of the receiver communications device 2.

Image data is input to an image data input unit 47, and the image data stored in an image data memory 51 is read out referring to the communications control table 50, and then input to a converter 48. On the other hand, the analyzer 44 analyzes the performance information stored in the performance control table 45. According to the analysis results, the converter 48 of the sender communications device 1 converts the format of the image data, and then send it in the form of an electronic mail from the mail sender 42. In other cases, the image data is sent in the form of facsimile from a facsimile sender 49. After completing transmission, a corresponding query record is deleted from the communications control table 50. In addition, a printer 46 prints communications error as required.

Next, a registration function for registering its own performance information to the performance exchange server 3 is described.

When performance information to be registered is input to the input unit 40, a performance registration unit 54 creates a registration message, and the mail sender 42 sends the message in the form of electronic mail to the performance exchange server 3. The mail receiver 43 then receives a return message telling completion of registration from the performance exchange server 3, and the registration of the performance information is complete.

A controller 52 controls the above overall operations of the communications device.

Third Exemplary Embodiment

Next, the performance exchange server 3 of the communications system of the present invention is described.

Figure 3:
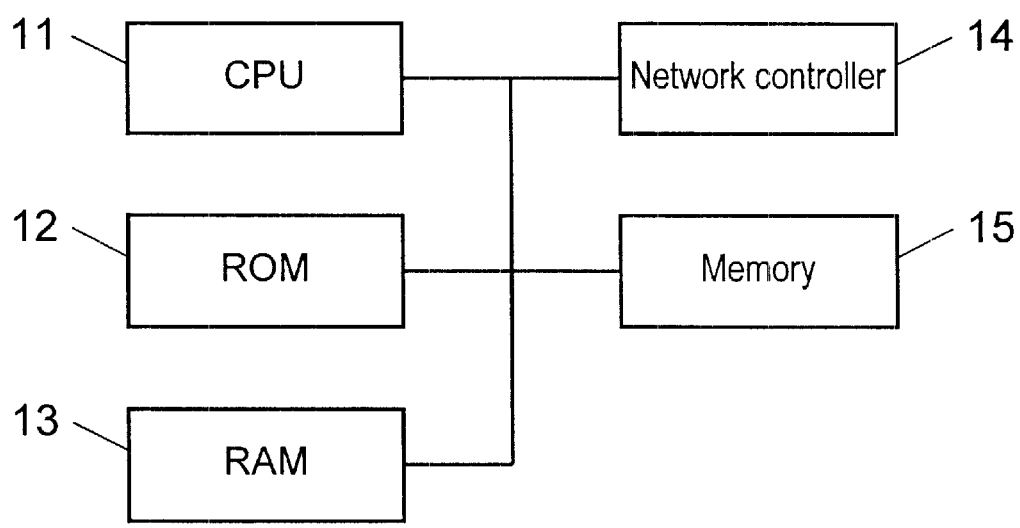
FIG. 3 is a block diagram illustrating the entire configuration of a performance exchange server of the present invention.

FIG. 3 shows a block diagram of the entire configuration of the performance exchange server 3. CPU 11, ROM 12, RAM 13, and network controller 14 have substantially the same configuration as the components of the communications device in FIG. 2.

The feature of the performance exchange server 3 is that it has a rewritable memory 15 with a large memory capacity like a hard disk. The memory 15 stores a terminal performance control table 63 (FIG. 5), which is described later, for storing data on the communications performance of each communications device, including paper size, resolution, compression format, file format, encryption information, term of validity, mail address, and telephone number.

Figure 5:
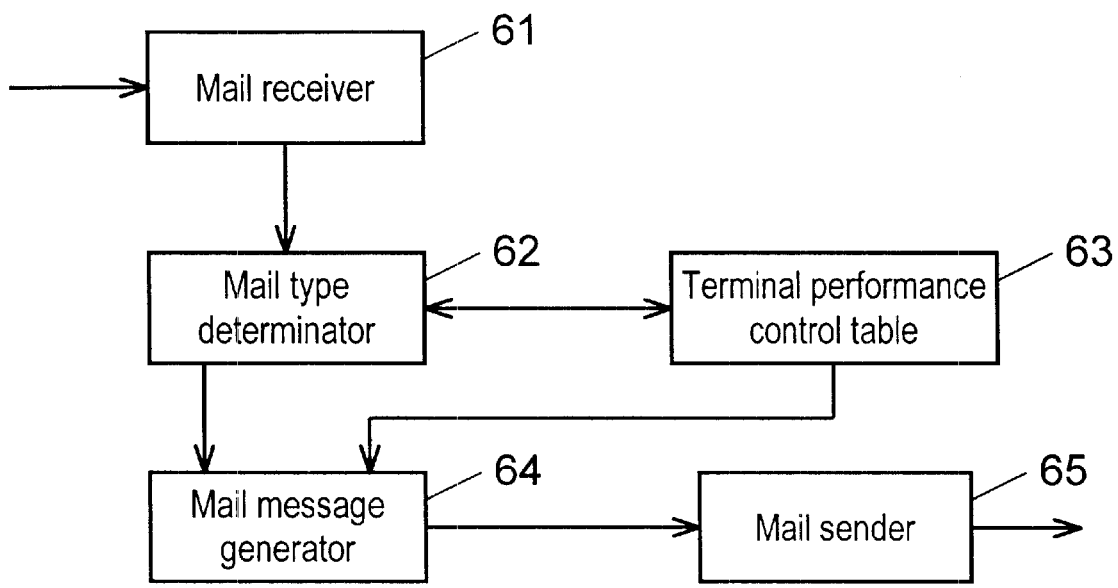
FIG. 5 is a block diagram of functions of the performance exchange server of the present invention.

FIG. 5 shows a block diagram illustrating functions of the performance exchange server 3. When the performance exchange server 3 receives mail via a mail receiver 61, a mail type determinator 62 determines whether the received mail is performance registration mail, inquiry mail, or error mail. If it is a performance registration mail, the performance exchange server 3 registers the performance information on the terminal performance control table 63 in the memory 15, and a mail message generator 64 creates a return mail message announcing completion of registration. A mail sender 65 then returns this message, in the form of electronic mail, to the communications device requesting registration.

When the mail type determinator 62 determines the mail as an inquiry mail, the server 3 reads out the performance information of the designated communications device, if it exists, from the performance information stored in the terminal performance control table 63. The mail message generator 64 then creates a return mail message containing the performance information readout. If no performance information of the designated communications device is registered in the terminal performance control table 63, the performance exchange server 3 creates a return mail message announcing that there is no matching performance information. The mail sender 65 returns either type of mail message to the communications device making inquiry.

If the mail type determinator 62 determines that the message is an error mail, the mail message generator 64 of the performance exchange server 3 creates a mail message announcing that an error exists. The mail sender 65 returns it to the sender communications device in the form of electronic mail.

Accordingly, the performance exchange server 3 stores performance information of communications devices, and responds appropriately to queries from communications devices.

Fourth Exemplary Embodiment

Next, the operation for sending image data from the sender communications device 1 after inquiring the performance information of the receiver communications device 2 to the performance exchange server 3 in the communications system of the present invention is described.

Figure 6:
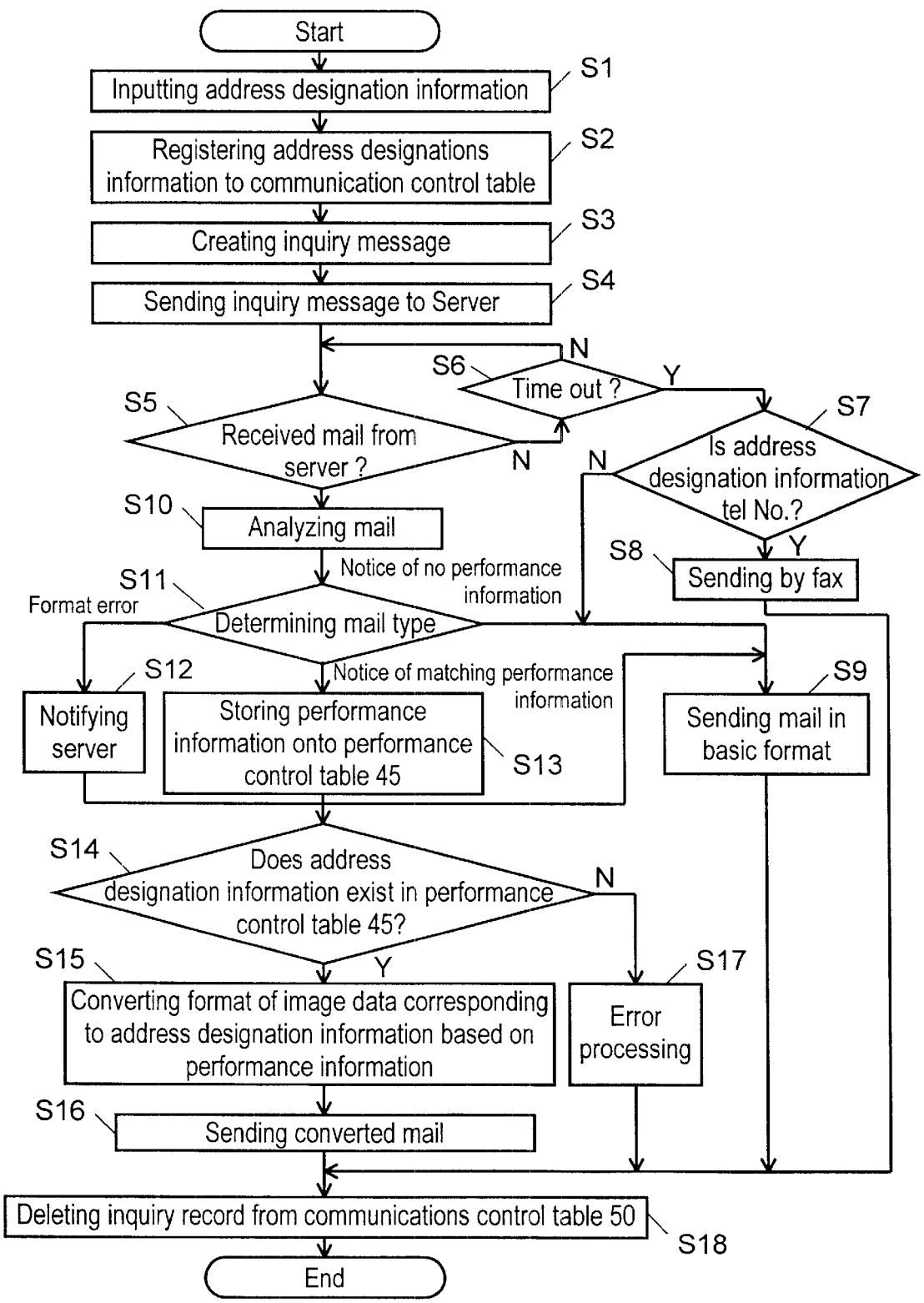
FIG. 6 is a flow chart illustrating data transmission in the communications device of the present invention.

FIG. 6 is a flow chart illustrating the operation for sending image data from the sender communications device 1. First, an operator inputs the address designation information such as a mail address B and telephone number to specify the receiver communications device. (Step 1, hereinafter referred to as S1.) The sender communications device 1 registers the input address designation information in a performance control table 45 (FIG. 4) such as that shown in Table 1 to control the status of inquiries on performance information to the performance exchange server 3 (S2).

TABLE 1

Example of performance control table 45

| Receiver communications device name | Address designation information | Sending data storage location |
|---|---|---|
| A | Address A | Pa |
| B | Address B | Pb |
| D | Telephone number D | Pd |
| • | • | • |
| • | • | • |
| • | • | • |

In Table 1, the receiver communications device name is a column for recording, as required, name, abbreviation, etc. of the receiver communications device 2 being queried. The address designation information is for identifying the receiver communications device 2 on the network or server. The sending data storage location is a pointer for designating a location in the image data memory 51 (FIG. 4) where image data to be sent is stored.

The sender communications device 1 creates an inquiry message to be sent to the performance exchange server 3 (S3), and sends the inquiry mail message to Address C of the performance exchange server 3 (S4). An example of such a mail message is shown next. If the address designation information of the receiver communications device 2 to be queried is Address B, the sender communications device 1 sends a message such as:

getaddress: Address B.

If the address designation information is a telephone number D, send a message such as:

gettel: Telephone number D.

The sender communications device 1 then enters the routine in which it stands by for a reply mail to the inquiry mail (S5). If a reply mail is not received within a predetermined period and the time is out (S6), the sender communications device 1 determines whether the address designation information is a telephone number (S7). If so, the message is sent via a facsimile line (S8). If the address designation information is not a telephone number, the message is sent in a basic format (S9). A mail in the basic format is a general format for electronic mail, such as a mail with an attached TIFF file in A4 format and 200 dpi (dots per inch) resolution.

When a return mail arrives from the performance exchange server 3 (S5), the sender communications device 1 analyzes the mail (S10) to determine whether the mail is a notice announcing no performance information, presence of performance information, or format error (S11). In case of format error, the sender communications device 1 notifies this fact to the performance exchange server 3 S12), and meanwhile sends the mail in the basic format (S9). In case of a notice announcing the presence of performance information, the sender communications device 1 receives a message such as that shown in Table 2.

Table 2 Example of a Message Received by the
Communications Device (When Performance
Information Exists)

Message-Id:
  <199901120408.AA00248@m900050.rdmg.mgcs.
  mei.co.jp>
From: address C
Date: Tue. Jan. 12, 1999 13:08:23 +0900
To: address B
Subject: Re: inquiry
In-Reply-To:
  <199901120253.AA00526@m910093.rdmg.mgcs.
  mei.co.jp>
MIME-Version: 1.0
X-Mailer: Microsoft Outlook Express 4.72.3110.5
Content-Type: text/plain: charset=iso2022-jp
Answer: address B, size: A4, resolution: 200DPI, encrypted
  information: public key
  Term of validity: Dec. 12, 1999, telephone number:
    +81-3-5454-7059
  Encryption method: MH, file format: TIFF, encrypted
    information: public key More specifically, as shown in the last part of Table 2, the reply message announces that the performance information of the receiver communications device 2 of Address B is as follows:

Paper size: A4
Resolution: 200 dpi
Compression type: MH
File format: TIFF
Encrypted information: Public key
Term of validity: Dec. 31, 1999
Telephone number: +81-3-5454-7059

The sender communications device 1 extracts the performance information received and stores it in the performance control table 45 (S13). It then determines whether the address designation information of that mail is in the performance control table 45 (S14). If the address designation information requested is in the performance control table 45 shown in Table 1, the communications device 1 reads out the image data corresponding to that address designation information from the image data memory 51 (FIG. 4), and its format is converted based on the performance information (S15). Then, a mail in the converted format is sent (S16).

If the performance information is not in the performance control table 45 (S14), the sender communications device determines that the information has, for some reason, been deleted from the performance control table 45, or determines the message to be an error mail from the performance exchange server 3, and executes error processing (S17).

If the mail type is a notice that no performance information exists as shown in Table 3 (S11), the performance information of a communications device specified by the address designation information is not stored in the performance exchange server 3. Accordingly, the sender communications device 1 sends a mail in the basic format (S9).

Table 3 Example of a Message Received by the
Communications Device (No Performance
Information)

Message-Id:
  <199901120408.AA00248@m900050.rdmg.mgcs.
  mei.co.jp>
From: address C
Date: Tue. Jan. 12, 1999 13:08:23 +0900
To: address A
Subject: Re: inquiry
In-Reply-To:
  <199901120253.AA00526@m910093.rdmg.mgcs.
  mei.co.jp>
MIME-Version: 1.0
X-Mailer: Microsoft Outlook Express 4.72.3110.5
Content-Type: text/plain: charset=iso2022-jp
Answer: Nothing After sending converted image data (S16), that in the basic format (S9), or error processing (S7), an inquiry record of the address designation information already sent is deleted from the communications control table 50 (S18), and the series of sending operations is complete.

The above describes the case of sending a message in the form of electronic mail. The message may also be sent using real time protocols such as DNS (Domain Name System) protocol or TCP/IP. In this case, however, no stand-by process (S5) is required. The same applies to the following operations.

When sending image data to more than one communications device simultaneously, the operations from input of address designation information (S1) to sending of inquiry mail to the server (S4) in the flow chart shown in FIG. 6 is repeated the required number of times. Then, the steps from stand-by for reply mail from the server (S5) to deletion of inquiry record in the communications control table 50 (S18) are repeated until there are no more inquiry records in the communications control table 50.

As an example of address destination information being used to designate a receiver communications device, address and telephone number are used in this exemplary embodiment. For making inquiries to the performance exchange server, it is preferable to designate the receiver communications device on the network by mail address or telephone number. However, if the receiver communications device is designated within the sender communications device, it is acceptable to designate by address designation information such as name, abbreviation, number or nickname of the receiver communications device because it is only needed for identification within the sender communications device. Such address designation information may then be converted to identifiers on the network line or telephone number before sending an inquiry to the performance exchange server. Furthermore, the present invention may be extended to designate a group of receiver communications devices, with each receiver communications device in the group is expanded in the performance control table 45 for inquiry and transmission.

More than one set of performance information on the receiver communications device may also be registered in the performance exchange server. When more than one set of performance information is received, the most suitable performance information may be selected for converting the format and sending the image data.

Fifth Exemplary Embodiment

The operation of the performance exchange server 3 in the communications system of the present invention is described next.

Figure 7:
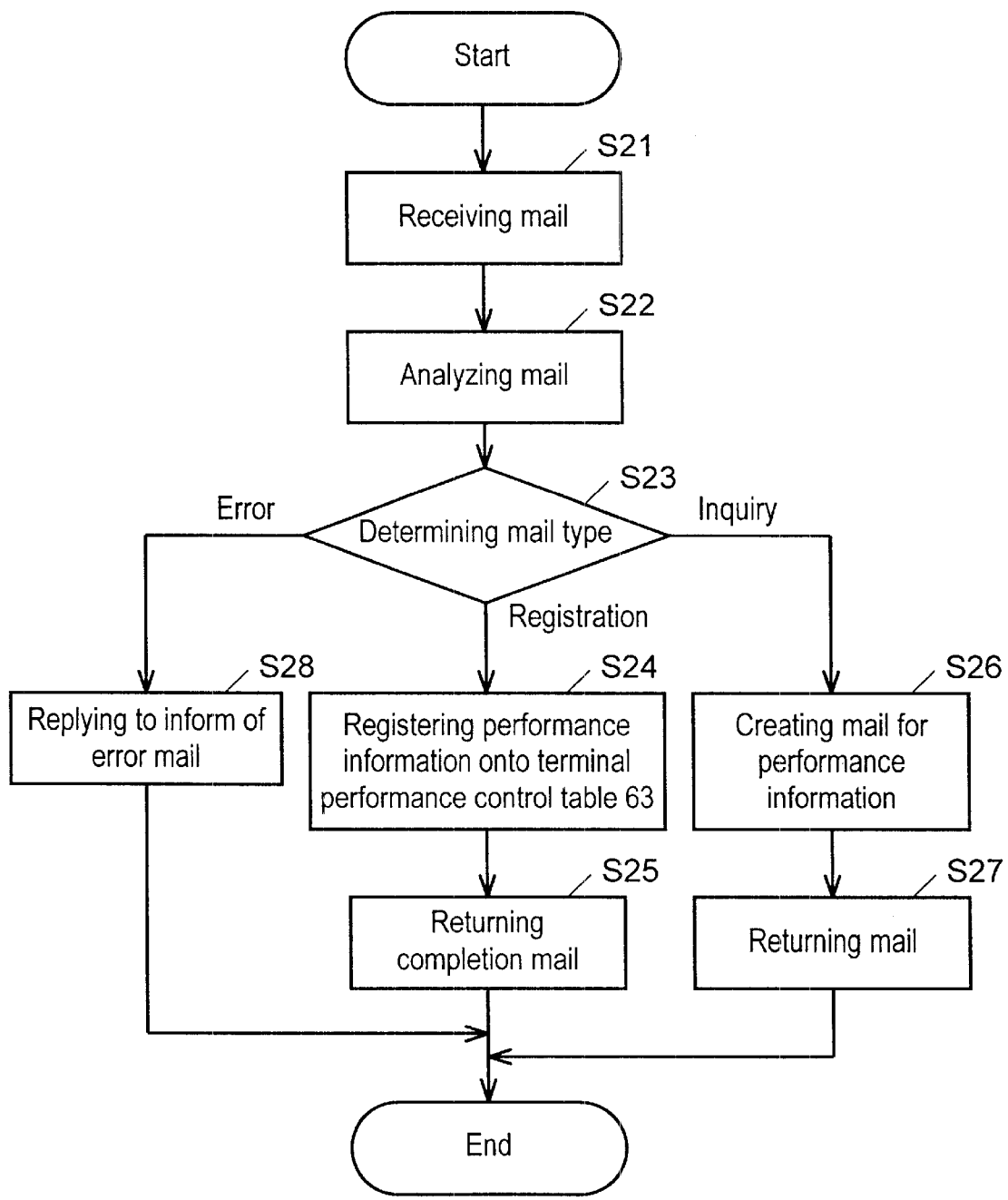
FIG. 7 is a flow chart illustrating operations from receiving to returning of mail by the performance exchange server of the present invention.

FIG. 7 is a flow chart illustrating steps from receiving mail at the performance exchange server 3 to providing answer in the communications system of the present invention. This operation is executed between the steps of sending inquiry message on communications device (S4) and standing by for reply (S5) in a flow chart shown in FIG. 6.

The performance exchange server 3 analyzes a mail (S22) when it receives the mail from the sender communications device (S21), and determines whether the mail is a performance information registration mail, inquiry mail of performance information, or an error message mail (S23). If the format of the received mail matches the format shown in Table 4, the performance exchange server 3 determines that the mail is a performance information registration mail.

Table 4 Example of Performance Information Registration Mail

Message-Id:
  <199901120408.AA00248@m900050.rdmg.mgcs.mei.co.jp>
From: address A
Date: Tue. Jan. 12, 1999 13:08:23 +0900
To: address C
Subject: registration
In-Reply-To:
  <199901120253.AA00526@m910093.rdmg.mgcs.mei.co.jp>
MIME-Version: 1.0
X-Mailer: Microsoft Outlook Express 4.72.3110.5
Content-Type: text/plain; charset=iso2022-jp
Subscribe: address A, size: A4, resolution: 200DPI, encrypted information: public key
Term of validity: Dec. 12, 1999, telephone number: +81-3-5454-7059

In this case, the performance exchange server 3 registers performance information to the terminal performance control table 63 as shown in FIG. 5 (S24). After completing registration, a completion mail is returned (S25), and the operation is completed.

mance exchange server 3 in the communications system of the present invention is described.

Figure 8:
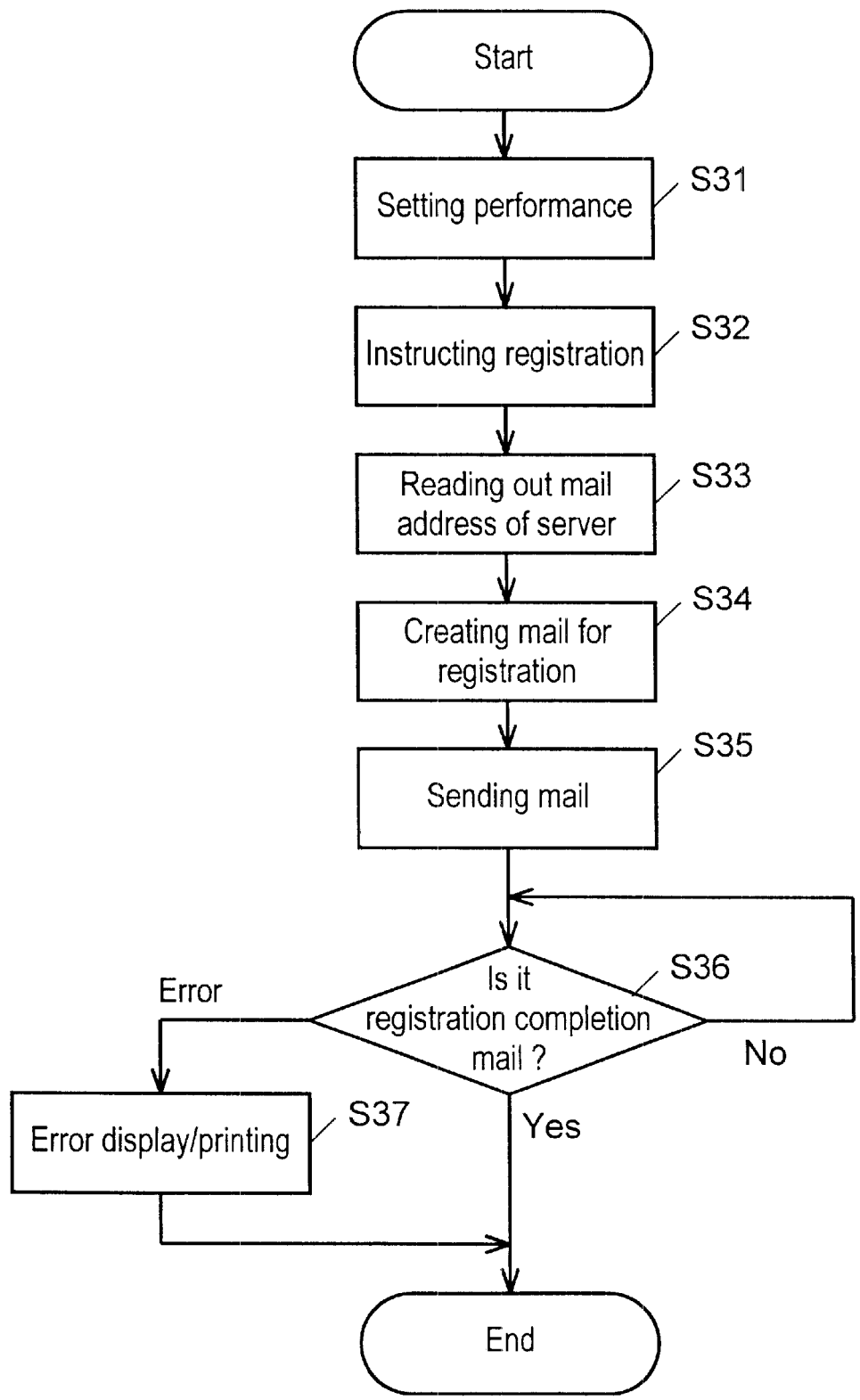
FIG. 8 is a flow chart illustrating the operation for registering performance information to the performance exchange server in the communications device of the present invention.

FIG. 8 is a flow chart illustrating the operation of the communications device for registering its performance information to the performance exchange server 3.

The communications device sets or updates the performance information such as its address, resolution, compression format, file format, encryption information, telephone number, term of validity of registration, mail address, telephone number and so on using a panel, keyboard, or a separate PCs; and sets the performance information in the communications device itself (S3 1). When the operator designates registration (S32) by pressing the designation button, for example, the communications device reads out the predetermined mail address of the performance exchange server 3 (S33). Then, the communications device creates a mail for registering the performance information of the communications device set as mentioned above (S34), and send the mail to the performance exchange server 3 (S35).

When the performance exchange server 3 receives the mail, the performance information is registered to the terminal performance control table 63 (refer to FIG. 5) as described in FIG. 7, and returns the registration completion mail to the communications device (S36). The communica-

TABLE 5

Example of terminal performance control table 63

| Address | Paper size | Resolution (DPI) | Compression format | File format | Encryption information | Term of validity | Tel No. | C |
|---|---|---|---|---|---|---|---|---|
| A | A4 | 200 | MH | TIFF | public key | 1999.12.31 | +81-3-5434-1111 | |
| B | A3 | 400 | MR | TIFF | public key | 1999.12.31 | +81-3-5555-1111 | |
| D | A4 | 200 | JPEG | JPEG | public key | 1999.12.31 | +81-3-3333-2222 | 1 |
| D | | | GIF | GIF | | | | |
| . | . | . | . | . | . | . | . | |
| . | . | . | . | . | . | . | . | |

For registering more than one piece of performance information in this example, the number is written in the C column (the rightmost column).

At determining the mail type (S23), if the mail is an inquiry mail, the performance exchange server 3 refers to the terminal performance control table 63 shown in Table 5 as described in FIG. 5 and a mail informing of the performance based on the performance information of the corresponding communications device is then created (S26), the reply mail is sent to the inquiry source (S27), and the operation completes. The reply mail is equivalent to the arrival mail (S5) of the communications device in the flow chart shown in FIG. 6.

At determining the mail type (S23) if the mail to be neither the registration mail nor inquiry mail, the performance exchange server 3 determines it as an error mail, and that is notified to the sender (S28) and the operation is completed.

Sixth Exemplary Embodiment

Next, the operation of the communications devices 1 and 2 for registering the performance information to the perfortions device completes the registration operation at receiving this registration completion mail. In case of occurrence of error, message announcing error is displayed or printed (S37) and the operation is completed.

If the performance information of the communications device is already stored in its memory, the communications device may read out its performance information and send a mail to the performance exchange server 3 when receiving instructions for registration.

Seventh Exemplary Embodiment

The operation of the communications device for automatically registering the performance information to the performance exchange server in the communications system of the present invention is described next.

Figure 9:
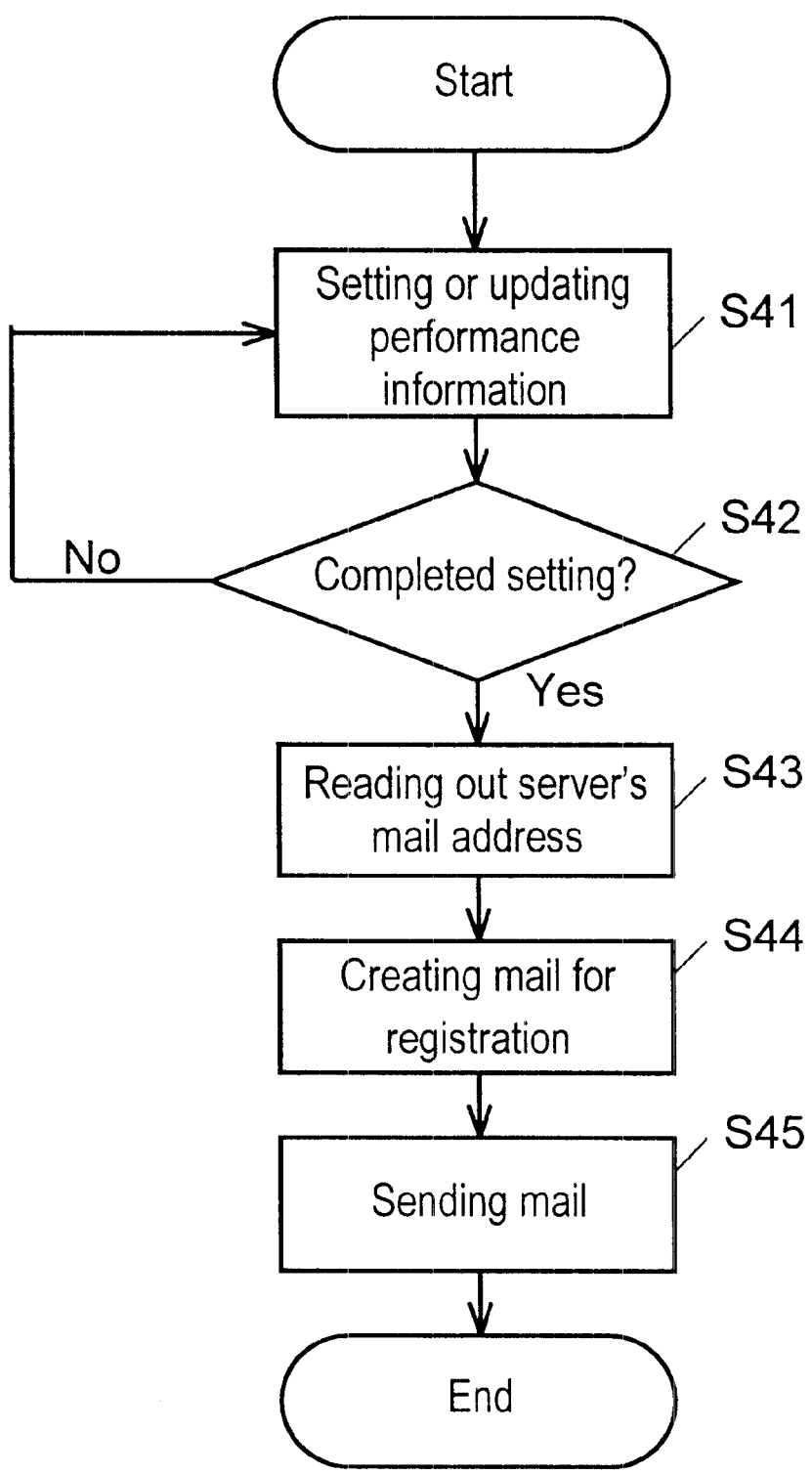
FIG. 9 is a flow chart illustrating the operation for automatically registering performance data to the performance exchange server in the communications device of the present invention.

FIG. 9 is a flow chart illustrating the operation of the communications device for automatically registering its performance information to the performance exchange server 3. The operator designates auto-registration at setting or updating the performance information such as its address, resolution, compression type, file format, encryption type, telephone number, term of validity of registration, mail address, telephone number and so on (S41). Then, it is determined if all settings are complete (S42). When it is determined that all settings are complete, the communications device reads out the mail address of the performance exchange server 3 (S43), and creates a registration mail (S44). This mail is automatically sent to the server 3 (S45). If it is determined that the settings are not complete (S42), the operation returns to the performance setting step (S41), and repeats this operation until the settings are complete.

Eighth Exemplary Embodiment

Next, the operation of the communications device configured to i) write the performance information inquired of the performance exchange server in its built-in performance control table 45 and then reuse it, and ii) to ask the performance exchange server for performance information which is not in the built-in performance control table 45 is described.

FIG. 10 is a flow chart illustrating transmission of image data from the sender communications device 1.

Address designation information such as a mail address and telephone number of the receiver communications device 2, and the image data to be sent are input to the sender communications device 1 (S51). Then, whether the inquiry function is set in the communications device 1 is determined (S52). This inquiry function may be designated by the operator at the time of sending mail without being predetermined.

If the inquiry function is not set, e.g. the performance information of the input receiver is already known, the communications device 1 determines whether the input address designation information is a telephone number or a mail address (S53). If the address designation information is a telephone number, the communications device 1 sends input image data via facsimile (S54). If the address designation information is a mail address, input image data is converted to an electronic mail format such as the Internet facsimile format (S60), and it is sent in the form of electronic mail (S61).

If the inquiry function is set (S52), the sender communications device 1 searches for the performance information corresponding to the address designation information of the receiver communications device 2 (S56) by referring to the performance control table 45 (refer to FIG. 4), storing the performance information in the communications device 1 (S55). If there is no applicable performance information, the sender communications device 1 inquires the performance exchange server 3 according to the procedures already described in steps 2 to 18 of FIG. 6, and obtains the performance information of the receiver communications device 2 (S59). If the performance information of the receiver communications device 2 is stored in the performance control table 45 (S56), the sender communications device 1 determines whether the term of encryption is valid (S57). If encryption is within the term of validity, the sender communications device 1 converts the format of input image data using the performance information parameters of the receiver communications device 2 registered in the performance control table 45 (S58), converts the image data to an electronic mail format such as the Internet facsimile format (S60), and sends it as electronic mail (S61). If encryption is out of the term of validity (S57), the sender communications device 1 inquires the server 3 again and obtains the performance information of the receiver communications device 2 according to the procedure already described in FIG. 6 because the public key information for decryption registered in the performance control table 45 has already been changed (S59).

Accordingly, the transmission time may be reduced by making the sender communications device 1 reuse the performance information of the receiver communications device 2 which has already been inquired of the performance exchange server 3.

By setting it to prohibit new inquiries, the sender communications device 1 effectively uses the existing performance information and sends the most suitable image to the receiver communications device 2 whose performance information has already been identified.

In the above exemplary embodiments of the invention, transmission data is used as image data. However, it is apparent that, as long as the performance of the sender and receiver communications devices match, other types of data such as characters, vector diagrams, and motion pictures can be sent in the same way.

In the exemplary embodiments, a telephone number and mail address are used as address designation information. However, URL (Uniform Resource Locator) is also applicable.

The communications device of the invention may be coupled to the network via a wireless communications pathway if it is not connected via a communications line. The network of the invention may include satellite communications pathway.

As described above, the present invention registers performance information of the receiving device in the performance exchange server in advance, calls the performance exchange server before sending data from the sender communications device, reads out the performance information of the receiver communications device from the performance exchange server, converts the data to be sent based on the performance information, and sends the converted data.

Accordingly, the image data to be sent is converted to the image data best suited to the receiving performance of the receiver communications device. Accordingly, the receiver may receive the image with the most appropriate image quality of which the receiver communications device is capable, at the most appropriate transmission rate.

If the performance information is not available, or format error occurs in the performance information, image data can be provided via electronic mail or TPC/IP communications by sending the image data by mail in the basic format, as long as the mail address of the receiver communications device is known.

If the telephone number is known, but not the mail address, transmission of image data can be ensured by sending it to the receiver via facsimile.

The present disclosure relates to the subject matter contained in Japanese Patent Application No. 10-64460, filed on Mar. 11, 1999, the contents of which are expressly incorporated by reference in its entirety.

Reference Numerals

| | |
|---|---|
| 1, 2 | communications device |
| 3 | performance exchange server |
| 4 | network |
| 5, 13 | RAM |
| 6, 12 | ROM |

-continued

| | |
|---|---|
| 7 | FAX unit |
| 8, 14 | network controller |
| 9 | scanner |
| 10 | printer |
| 11, 20 | CPU |
| 15 | memory |
| 40 | input unit |
| 41 | performance inquiry unit |
| 42, 65 | mail sender |
| 43, 61 | mail receiver |
| 44 | analyzer |
| 45 | performance control table |
| 46 | printer |
| 47 | image data input unit |
| 48 | converter |
| 49 | facsimile sender |
| 50 | communications control table |
| 51 | image data memory |
| 52 | controller |
| 54 | performance registration unit |
| 62 | mail type determinator |
| 63 | terminal performance control table |
| 64 | mail message generator |

What is claimed is:

1. A method for transmitting image data from a transmitting terminal to a receiving terminal via a network, using a server that stores format information of a plurality of receiving terminals, the transmitting terminal being connectable to the server, the method comprising:

obtaining image data to be transmitted;

determining, by inputting an address of a receiving terminal, whether format information of the receiving terminal is stored in the server;

obtaining the format information of the input receiving terminal at the transmitting terminal from the server when it is determined that format information of the receiving terminal is stored in the server, the format information including at least one of paper size, resolution and compression format;

converting a first format of the obtained image data to a second format in accordance with the obtained format information, the first format being different from the second format; and transmitting the converted image data to the receiving terminal via the network, wherein, when it is determined that format information of the receiving terminal is not stored in the server, the converting converts a first format of the obtained image data to a third format in accordance with a minimum format.

2. The method according to claim 1, further comprising:

storing the format information of the receiving terminal, obtained from the server, into a memory of the transmitting terminal.

3. The method according to claim 2, wherein the converting converts a format of the obtained image data, utilizing the format information stored in the memory of the transmitting terminal.

4. The method according to claim 1, wherein the server stores addresses of a plurality of receiving terminals and format information associated with each stored address.

5. The method according to claim 1, wherein, when the determining determines that format information of the receiving terminal is not stored in the server, the transmitting terminal receives a message indicating that the server does not store the format information from the server.

6. A method for transmitting image data from a transmitting terminal to a receiving terminal via a network, using a memory that stores format information of a plurality of receiving terminals, the method comprising:

obtaining image data to be transmitted;

determining, by inputting an address of a receiving terminal, whether format information of the receiving terminal is stored in the memory;

obtaining the format information of the input receiving terminal at the transmitting terminal from the memory, when it is determined that format information of the receiving terminal is stored in the memory, the format information including at least one of paper size, resolution and compression format;

converting a first format of the obtained image data to a second format in accordance with the obtained format information, the first format being different from the second format; and transmitting the converted image data to the receiving terminal via the network, wherein, when it is determined that format information of the receiving terminal is not stored in the memory, the converting converts a first format of the obtained image data to a third format in accordance with a minimum format.

7. A method for transmitting image data from a transmitting terminal to a receiving terminal via a network, using a server that stores format information of a plurality of receiving terminals and associated addresses, the transmitting terminal having a memory that stores format information of a plurality of receiving terminals, the transmitting terminal connectable to the server, the method comprising:

obtaining image data to be transmitted;

determining, by inputting an address of a receiving terminal, whether format information of the receiving terminal is stored in the memory;

obtaining the format information of the input receiving terminal at the transmitting terminal from the memory when it is determined that format information of the receiving terminal is stored in the memory, the format information including at least one of paper size, resolution and compression format;

converting a first format of the obtained image data to a second format in accordance with the obtained format information, the first format being different from the second format; and transmitting the converted image data to the receiving terminal via the network, wherein, when it is determined that format information of the receiving terminal is not stored in the memory, the transmitting terminal obtains the format information of the receiving terminal from the server.

8. The method according to claim 7, wherein, when it is determined that format information of the receiving terminal is not stored in the server, the converting converts a first format of the obtained image data to a third format in accordance with a minimum format.

* * * * *